United States Patent [19]

Wallace

[11] Patent Number: 4,695,189
[45] Date of Patent: Sep. 22, 1987

[54] ROTATING CONNECTION ASSEMBLY FOR SUBSEA PIPE CONNECTION

[75] Inventor: Norman R. Wallace, Walnut Creek, Calif.

[73] Assignee: Bechtel International Corporation, San Francisco, Calif.

[21] Appl. No.: 853,804

[22] Filed: Apr. 18, 1986

[51] Int. Cl.⁴ .............................................. F16L 1/04
[52] U.S. Cl. ................................... 405/169; 166/339; 166/345; 405/170
[58] Field of Search ............... 405/169, 170, 171, 227; 166/338, 339, 343, 344, 345

[56] References Cited

U.S. PATENT DOCUMENTS

| | | | |
|---|---|---|---|
| 3,352,356 | 11/1967 | Wakefield, Jr. ...................... | 405/169 |
| 3,361,200 | 1/1968 | Chambers ............................ | 166/346 |
| 3,373,807 | 3/1968 | Fischer et al. ...................... | 166/345 |
| 4,591,296 | 5/1986 | Henderson, Jr. et al. .......... | 166/339 |

FOREIGN PATENT DOCUMENTS 2099894  12/1982  United Kingdom ................ 405/169

Primary Examiner—Dennis L. Taylor
Attorney, Agent, or Firm—Townsend and Townsend

[57] ABSTRACT

A subsea connection assembly including a connection box having an open top and provided with a plurality of pipe segments coupled thereto, each pipe segment having an outlet end near the open top of the connection box. The pipe segments have their inlet ends coupled to a manifold assembly having connections to subsea wells. Guide wires are attached to the connection box for guiding a frame downwardly from a floating vessel or platform on the surface of the sea, the frame being operable to carry the lower ends of a plurality of fluid conductors downwardly to the connection box so that such lower ends can become connected to the outlet ends of the pipe segments. The connection box is adapted to be pivotally mounted on the sea bed so that it can pivot through an angle, such as 90 degrees, and lay on its side after the fluid conductors have been coupled to the pipe segments, whereby the fluid conductors define a J-shaped riser for transport of hydrocarbons from the subsea wells and, through the manifold assembly, the pipe segments, and the fluid conductors to the vessel. The material of the pipe segments allows them to be twisted or torqued to assure that they remain tubular as the connection box pivots, yet no sliding or rotating seals are required in the connections of the pipe segments to the fluid conductors and to the manifold assembly.

21 Claims, 6 Drawing Figures

ROTATING CONNECTION ASSEMBLY FOR SUBSEA PIPE CONNECTION

BACKGROUND OF THE INVENTION

This invention relates to improvements in the transport of hydrocarbons from subsea wells and, more particularly, to a connection assembly for connecting subsea wells to fluid conductors extending downwardly in a cluster from a production vessel or platform on the surface of the sea.

In offshore exploratory drilling and production activities, vertical fluid conductors, known as risers, are stabbed vertically from a surface vessel or platform into a preset and piled connection terminal on the seabed. Since such a riser is always maintained in a vertical position during use, the subsea connection always remains upright and there is no rotation of the terminal.

Submarine pipelines and flowlines intended to lie on the sea bed during operation are often pulled across the seabed and into a connection box. This connection box is fixed to face in the direction of the incoming pipeline or pipeline bundle. No rotational capability is built into the connection box.

The prior art connection techniques just described are cumbersome to install and maintain, thus adding to the expense of producing hydrocarbons from subsea wells. To minimize the expense involved in recovering hydrocarbons from subsea wells, improvements are needed in the way in which connections are made between pipes required to provide fluid flow passages for the production fluids. The present invention provides such improvements.

SUMMARY OF THE INVENTION

The present invention provides a subsea connection box having means for pivotally mounting the same on a seabed. The connection box is further provided with a plurality of pipe segments which pivot therewith and are coupled to a manifold assembly whose inlet ends are adapted to be coupled to subsea wells. The pipe segments carried by the connection box are adapted to be coupled to fluid conductors forming a J-shaped riser after the fluid conductors have first been coupled to the outlet ends of the pipe segments and then the connection box is pivoted from a first, generally upright position to a second position on its side.

The connection box has means for guiding a frame thereto. The frame has lower ends of the fluid conductors releasably attached thereto, and the frame is caused to move downwardly from a production vessel or platform on the surface of the sea to bring the fluid conductors to the connection box. Fittings are provided on the pipe segments and the fluid conductors to interconnect the same when the frame moves into a position with the lower ends of the fluid conductors adjacent to and in alignment with the outlet ends of the pipe segments.

Once the fluid conductors are connected to the pipe segments, the lengths of the fluid conductors are progressively increased, causing the connector box to pivot as the vessel moves laterally from its initial position directly over the connection box. When this occurs, the connection box is pivoted to lay it on its side, and the fluid conductors extend along the seabed for a distance and then extend upwardly toward the vessel, whereupon the fluid conductors form a J-shaped riser.

The pipe segments can be of a material which allows them to be twisted or torqued as the connection box is pivoted so that the pipe segments remain tubular and do not pinch off or become blocked which would otherwise interrupt the flow of hydrocarbons through the pipe segments to and through the fluid conductors. This feature allows the connection box and pipe segments to pivot without the need for rotating or sliding seals which are a source of leakage because of the high pressures which they must sustain when production fluids flow therethrough.

The primary object of the present invention is to provide an improved connection assembly for coupling subsea wells to a surface vessel or platform wherein the connection assembly includes a pivotal connector box having pipe segments thereon which are free of rotating or sliding seals to thereby permit fluid conductors extending downwardly from the vessel or platform to form a J-shaped riser when the connection box pivots so that it lays on its side from an upright position.

Other objects of this invention will become apparent as the following specification progresses, reference being had to the accompanying drawings for an illustration of the invention.

IN THE DRAWINGS

Figure 1:
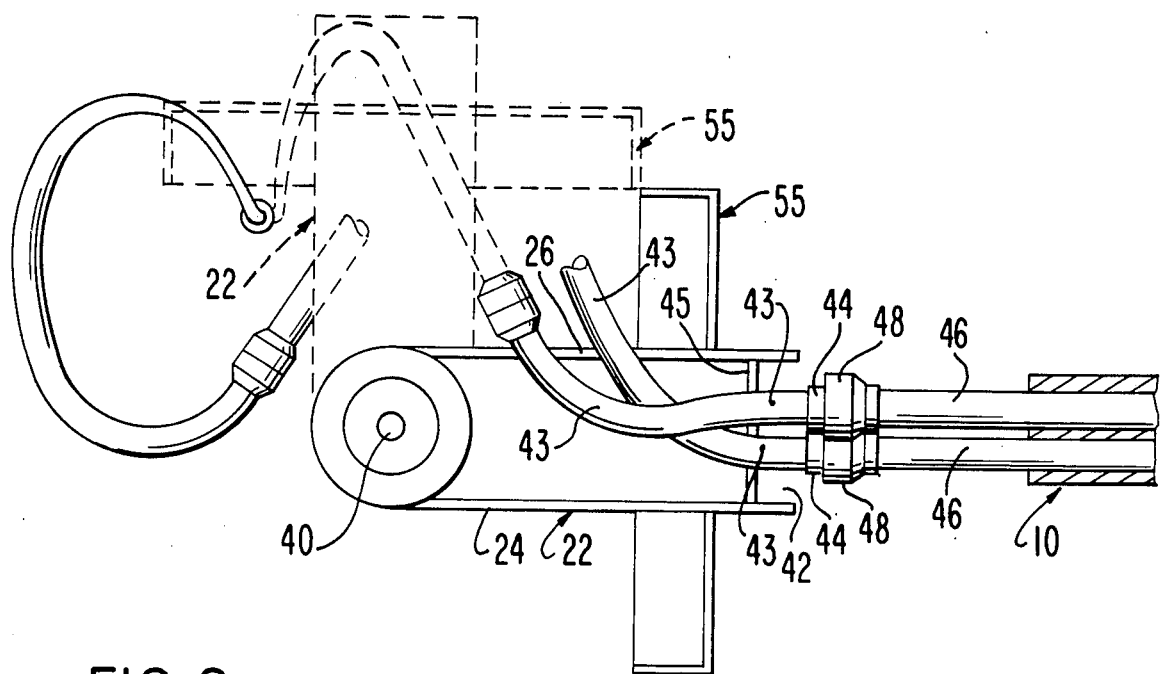
FIG. 1 is a side elevational view, partly schematic, of the rotatable subsea connection box of the present invention, two positions of the connection box being shown.
Figure 2:
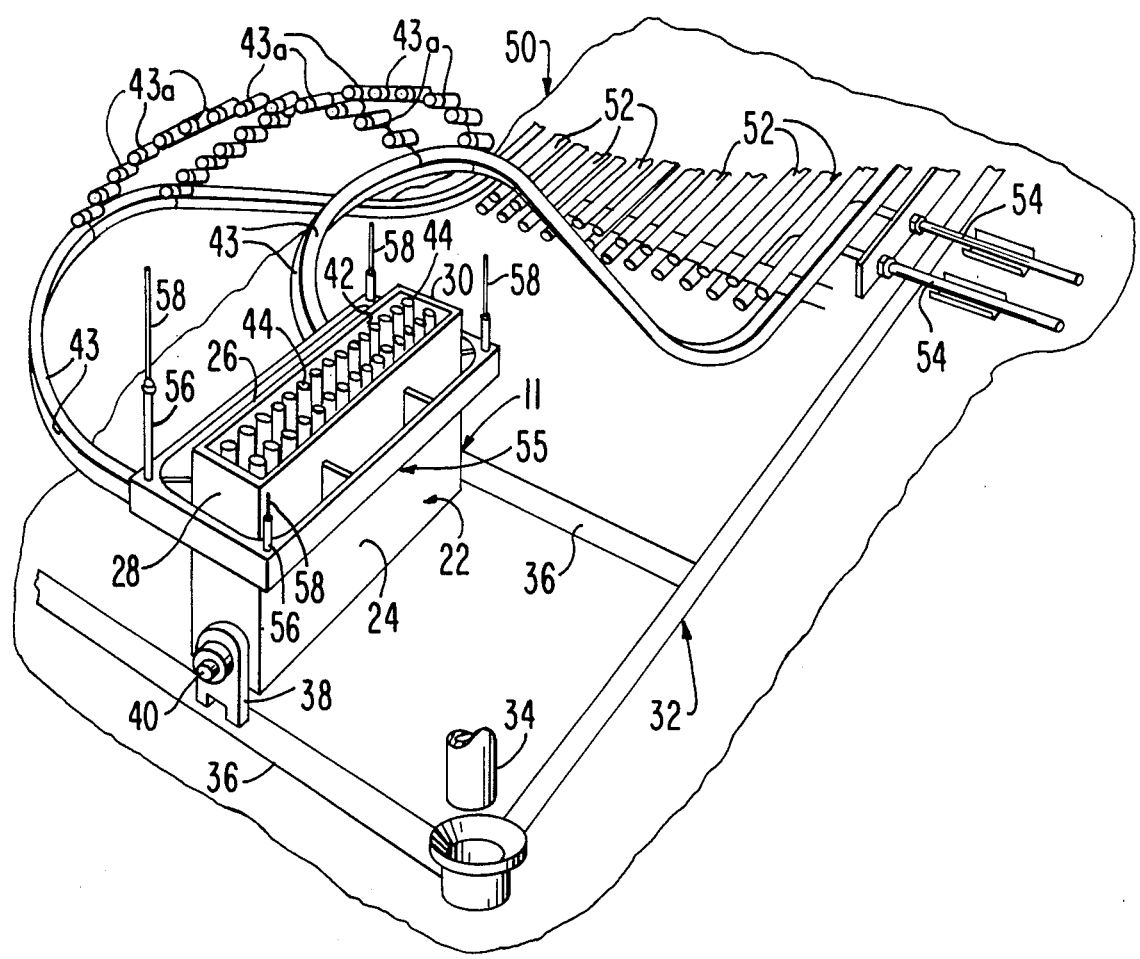
FIG. 2 is a perspective view of the connection box in its upright position, before it is pivoted into a generally horizontal position as shown in full lines in FIG. 1.
Figure 3:
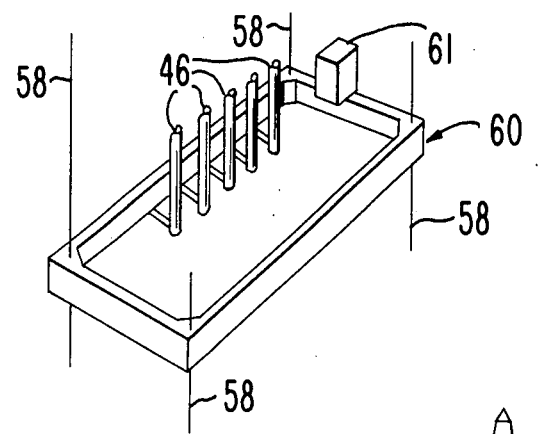
Figure 4:
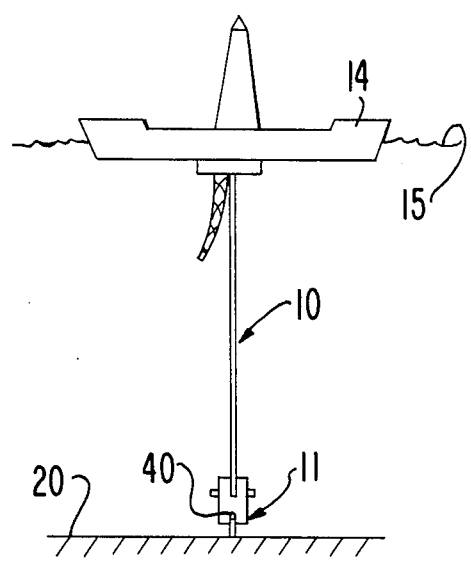
Figure 5:
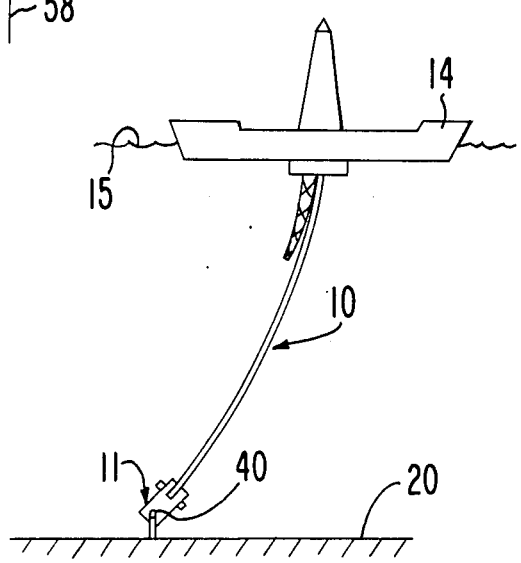
Figure 6:
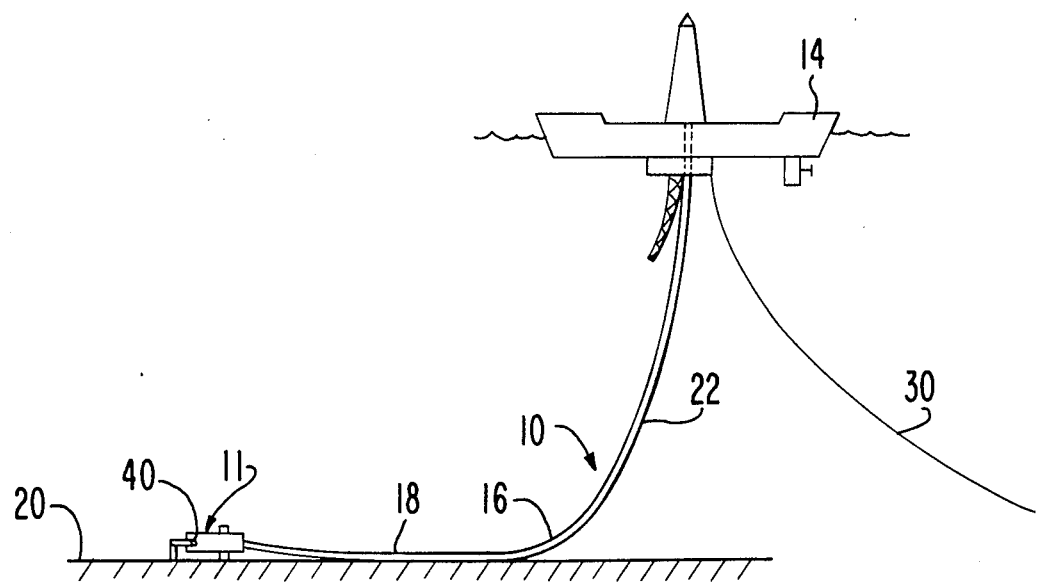

FIG. 3 is a schematic, perspective view of a frame for carrying a number of fluid conductors downwardly from a vessel or platform to the inlet ends of fluid conductors carried by the connector box of FIGS. 1 and 2; and FIGS. 4, 5 and 6 are sequential views showing the way in which the conductors extending downwardly from a vessel to the connector box are allowed to move into a J-configuration as shown in FIG. 6.

The present invention is directed to a connection assembly 11 to be used with one or more pipelines, flowlines or fluid conductors 46 in a cluster broadly denoted by the numeral 10 and shown in FIGS. 1, 2 and 4–6. The assembly of fluid conductors extends from a connector box 22 of assembly 11 which forms the subject of the present invention to a vessel 14 or other platform on the water surface 15, connector box 22 being pivotally connected in a manner hereinafter described on the sea bottom 20 (FIGS. 4-6). The connection box 22 is adapted to be coupled for pivotal movement from an upright position shown in FIG. 4 to a generally horizontal position shown in FIG. 6.

Connection box 22 is shown in more detail in FIGS. 1 and 2 and includes a pair of spaced, parallel side walls 24 and 26 and a pair of spaced end walls 28 and 30 connecting side walls 24 and 26 to each other. A bottom wall connects side and end walls 24, 26, 28 and 30. The connection box 22 has an open top.

Connection box 22 is pivotally coupled on a frame 32 (FIG. 2) which is adapted to be anchored in some suitable manner, such as by piles 34, to the subsea surface 20. Frame 32 has a pair of spaced struts 36 on which the end walls 28 and 30 of connector box 22 are pivotally mounted. To this end, each of the struts 36 has a bracket 38 which is rigidly secured in any suitable manner to the strut 36 and extends upwardly therefrom. Each bracket 38 has a stub shaft 40 which projects therethrough and is attached to the adjacent end wall 28 or 30. Thus, shafts 40 pivotally mount the connector box 22 on frame struts 36 for rotation about a generally horizontal axis.

The bottom of the connector box 22 is spaced above the seabed 20 when the connector box 22 is in an upright position as shown in FIG. 2. FIG. 1 shows the connector box 22 in dashed lines in its upright position and in full lines in its tilted position 90° from the position shown in dashed lines in FIG. 1.

The open top 42 of connector box 22 exposes the outlet ends of a plurality of pipe segments 43 having fittings 44 which are adapted to be coupled with fittings 48 of corresponding fluid conductors 46 forming the cluster 10. These fluid conductors 46 are are shown in FIG. 1. Each fluid conductor 46 has its fitting 48 on the lower end thereof for coupling with the corresponding fitting 44 on the upper end of the respective pipe segments 43 (FIGS. 1 and 2). Each pipe segment 43 is coupled in some suitable manner, such as by a web 45 (FIG. 1) coupled to and spanning the distance between side walls 24 and 26 of connector box 22. Each web is near the open top of the connector box 22.

Each pipe segment 43 is flexible to some degree and extends outwardly from box 22 in any suitable manner to a manifold assembly broadly denoted by the numeral 50 (FIG. 2). The pipe segments 43 can be rigid steel pipe, flexible steel pipe or other material. They accommodate the 90° rotation of the connector box by undergoing twisting about their longitudinal axes. To reduce the residual torsion strain remaining in these segments when the connector box is fully laid over, the unstressed condition can be made to occur when the connector box is at the intermediate angle of 45°.

Manifold assembly 50 includes a plurality of fluid flow pipes 52 which are adapted to be coupled to respective subsea wells (not shown) or to wells drilled and completed through a template integrated with the manifold. A pair of such flowlines 54 are shown in FIG. 2. These flowlines need not be pulled into the manifold (by existing methods) before the connector box is laid over and put into operation. The pull-in can be done afterwards. The geometry, material and lengths of pipe segments 43 are such as to allow them to be twisted or torqued so that they can accommodate the pivotal movement of connection box 22 as the box is pivoted from its upright position shown in FIG. 2 to its horizontal position shown in FIG. 1. The short extensions denoted by the numeral 43a in FIG. 2 represent additional fluid flow members 43 and have been shown in shortened form to simplify the drawing.

A rectangular frame 55 is carried by side and end walls 24, 26, 28 and 30 of connection box 22 as shown in FIG. 2. This frame has guide posts 56 to which the lower ends of guide wires 58 attach. Guide wires 58 extend upwardly to vessel 14 (FIGS. 4-6) and are used to guide frame 60 (FIG. 3) downwardly from vessel 14 to connection box 22. Frame 60 accompanies the lower end of piping cluster 10 down the guide wires 58 and docks on guide posts 56. Once frame 60 is docked, equipment 61 emplaced thereon can bring the lower ends of fluid conductors 46 into intimate relationship with upper end fittings 44, actuate locking mechanisms, externally test for leaktightness and release altogether from frame 55 by remote hydraulic actuation from the sea surface. The fittings 44 of the lower ends of fluid conductors 46 are releasably coupled to frame 60 in any suitable manner, there being a fitting 48 for each fitting 44, respectively.

As the frame 60 is lowered, it carries with it the corresponding fluid conductors 46 until fittings 48 on conductors 46 mate with and are releasably interconnected to corresponding fittings 44 on respective fluid flow members 43.

The connector assembly defined by each pair of fittings 44 and 48 can be of any suitable construction, such as Cameron collet connectors. Once the testing has been completed, frame 60 carrying hydraulic apparatus 61 will be remotely disconnected from the fluid conductors 46 and will be withdrawn upwardly along the wire guide lines 58 to the vessel 14 (FIGS. 4-6).

In operation, connection box 22 is pivotally mounted by shafts 40 and brackets 38 on struts 36 of frame 32 when the frame is anchored by piles 34 on seabed 20. It will be assumed that fluid flow members 43 will have been coupled to manifold 50 so that hydrocarbons can flow from subsea wells coupled to the pipes 52 of manifold 50. Suitable valving (not shown) may be provided to control the flow of hydrocarbons or other minerals from the subsea well, through manifold 50, and through pipe segments 43 to end fittings 44.

Vessel 14 initially is above the connection box 22, and frame 60 (FIG. 3) is guided downwardly by guide wires 58 to carry fluid conductors 46 as a cluster denoted by the numeral 10. Fluid conductors 46 are formed by interconnecting pipe segments, such as 40-foot lengths of pipe, which are welded at vessel 14 in end-to-end relationship to each other.

When frame 60 is supported on frame 55 after being guided downwardly to connection box 22 by guide wires 58, hydraulic apparatus 61 on frame 60 will be actuated to hydraulically couple fittings 44 and 48 together and then test the fitting connections. When testing has been completed, frame 60 is raised to vessel 14, and additional pipe lengths of fluid conductors 46 are added to the pipe lengths already extending downwardly from the vessel. This causes the length of cluster 10 to progressively increase. Vessel 14 is moved laterally from the position shown in FIG. 4 to the position shown in FIG. 5 as the pipe length of cluster 10 becomes greater than the vertical distance between vessel 14 and connection box 22. As the length of cluster 10 increases, box 22 tilts as shown in FIG. 5 and eventually lays on its side as shown in FIG. 6. In this position of connection box 22, cluster 10 forms a J-shaped riser having a horizontal portion 18, a vertical portion 22 and a sag bend portion 16 between portions 18 and 22. At this position of the connection box, production can commence and the vessel can be anchored by one or more cables 30 extending downwardly to the seabed 20.

As the connector box rotates into its operating position shown in FIG. 6, the corresponding pipe segments 43 can be pivoted, twisted or torqued so as to change position without the need for rotating seals. This feature is shown in FIG. 1 wherein the full line position of a pipe segment 43 indicates its position when the connector box 22 is in its upright position, and the dashed line position of the same pipe segment 43 indicates its position when connector box 22 lays on its side as shown in FIG. 6. Although connection box 22 rotates on some shaft bearing surfaces, the bundle 10 of fluid conductors 46 between the connection box 22 and manifold 52 do not have sliding seals. The rotation is taken up by twisting or torquing these conductors as shown in FIG. 1. The advantages gained include a leaktight connection whose integrity can be guaranteed by non-destructive testing on shore before the connection box 22 is installed on seabed 20.

The interconnecting pipe segments 43 may be flexible steel pipe or rigid tubulars if the tubular material and geometrical design can sustain the torquing required as described above. If required, connection box 22 could be hydraulically powered during rotation, using one of the pipe segments 43 as a hydraulic fluid conductor. A feature of the present invention is that it can be made reversible so that the cluster 10 of fluid conductors 46, once installed, using the rotating connection box 22, can be removed or replaced remotely. To effect this reversal, the procedure described above with respect to forming the J-shaped riser of FIG. 6 can be reversed to recover the fluid conductors 46 from connection box 22, once the assembly has been returned to a vertical position.

To recover the fluid conductors 46 of cluster 10, the J-shaped riser shown in FIG. 6 can be progressively shortened so that it moves from the FIG. 6 position, through the FIG. 5 position to the FIG. 4 position, whereupon the fittings 48 of fluid conductors 46 can be separated from fittings 44 of the connection box and the cluster of fluid connectors 46 can be raised and stored as pipe segments on vessel 14.

The axis of rotation of connection box 22 can be made to take place along more than one axis of rotation. For example, the connection box 22 can rotate 90° as shown in FIGS. 4, 5 and 6 to lay the fluid conductors 46 on seabed 20 to form the J-shaped riser; then, the connection box 22 can be made to rotate 90° about a second axis at right angles to the first axis if the pipe bundle is to be laid on its side.

I claim:

1. A connection assembly for interconnecting a subsea well with a platform floating on the surface of the sea comprising:
    a connection box;
    means coupled with the connection box for pivotally mounting the same on the sea bed for movement from a first position to a second position, said connector box having a flexible pipe segment coupled thereto and being structurally deformable as the connection box moves between said first and second positions, said pipe segment having an inlet end and an outlet end, said inlet end adapted to be coupled to a subsea well to direct flowable hydrocarbons from the well to the outlet end of the pipe segment, there being fitting means on the outlet end of the pipe segment for attachment of the lower end of a fluid conductor extending between the connections box and the vessel, the connection box being pivotal from the first position to the second positions as the length of the fluid conductor to form a J-shaped riser extending between the vessel and the connection box.

2. A connection assembly as set forth in claim 1, wherein the pipe segment is formed from a material capable of being twisted as the connection box pivots from the first position to the second position.

3. A connection assembly as set forth in claim 1, wherein the pipe segment is formed from a material capable of being torqued to accommodate the movement of the pipe segment as a function of the pivotal movement of the connection box.

4. A connection assembly as set forth in claim 1, wherein the pipe segment has a length sufficient to provide slack in the pipe segment so as to allow movementof the pipe segment from a first operative location to a second operative location in response to the pivotal movement of the connection box from said first position to said second position.

5. A connection assembly as set forth in claim 1, wherein the mounting means includes a frame, and a shaft means pivotally mounting the connection box on the frame.

6. A connection assembly as set forth in claim 1, wherein the connection box has a first frame rigidly mounted thereto and surrounding the same near the upper end thereof, there being a second frame, said first frame having guide means thereon for guiding the second frame into a location at which the second frame is supported by the first frame, said second frame adapted to carry the lower ennd of the fluid conductor downwardly and into coupled relationship with the outlet end of the pipe segment.

7. A connection assembly as set forth in claim 6, wherein said guide means includes a plurality of guide wires adapted to be coupled to a vessel and to extend downwardly therefrom to said first frame.

8. A fluid transport apparatus for use between a number of subsea wells and vessel floating on the surface of the sea comprising;
    a connection box having an open top;
    means coupled with the connection box for pivotally mounting the connection box on the seabed for movement from the first position through an angle to a second position, said connection box having a plurality of pip segments coupled thereto, each pipe segment having an inlet end and an outlet end, the outlet end being near the open top of the connection box, each pipe segment adapted to be coupled at its inlet end to a subsea well and being of a flexible material capable of allowing the pipe segment to be structurally deformable as a function of the movement of the connection box from said first position to said second position to accomodate the relative movement of the inlet end and the outlet end of the pipe segment, there being fitting means on the outlet end of each pipe segment, respectively, for connecting the pipe segment with a respective fluid conductor extending between the vessel and the connection box; and
    means coupled with the connection box for guiding the lower ends of the fluid conductors downwardly from the vessel and into coupled relationship with the respective pipe segments, whereby as the length of the fluid conductor increases, the connection box wil be pivoted from the first position to the second position to cause the fluid conductors to form J-shaped riser between the connection box and the vessel.

9. Apparatus as set forth in claim 8, wherein said connection box has a pair of opposed side walls and a pair of opposed end walls, said mounting means including shaft means coupled with the end wall for pivoting the connection box about a generally horizontal axis.

10. Apparatus as set forth in claim 9, wherein said mounting means includes a frame adapted to be secured to the seabed, said shaft means including a shaft pivotally coupling each of the end walls of the connection box to the frame.

11. Apparatus as set forth in claim 10, wherein the frame includes a pair of generally parallel struts, each strut having a bracket thereon, said shaft structure including a stub shaft coupled with each bracket, respectively, and a respective end wall of the connection box to allow the connection box to pivot on the stub shafts into the second position from the first position.

12. Apparatus as set forth in claim 8, wherein is included a manifold assembly for coupling the inlet ends of the pipe segment with respective subsea wells.

13. Apparatus as set forth in claim 12, wherein the manifold assembly has means for mounting the same on the seabed.

14. Apparatus as set forth in claim 8, wherein said guide means includes a first frame on the connection box, a second frame movable downwardly from the vessel, and guide wire means for guiding the second frame downwardly and into supporting relationship on the first frame, the second frame having means for releasably coupling the lower ends of the respective fluid conductors thereon.

15. Apparatus as set forth in claim 14, wherein said guide wire means includes a plurality of generally vertical guide wires secured to and extending upwardly from the first frame.

16. Apparatus as set forth in claim 8, wherein the first frame has means thereon for securing the first frame to the connection box near the open upper end thereof.

17. Apparatus as set forth in claim 8, wherein the pipe segments are flexible pipe lengths.

18. Apparatus as set forth in claim 8, wherein said pipe segments are of a material capable of being twisted while remaining tubular as the connection box moves from the first position to the second position.

19. Apparatus as set forth in claim 8, wherein the pipe segments are formed from a material capable of being torqued to allow the pipe segments to assume new operative locations as the connection box moves from the first position to the second position and as the pipe segments remain tubular.

20. Apparatus as set forth in claim 8, wherein the angle of movement of the connection box is approximately 90 degrees.

21. Apparatus as set forth in claim 8, wherein the connection box is pivotal in reverse from the second position to the first position to permit recovery of the fluid conductors, said fitting means being operable to permit separation of each pipe segment from its respective fluid conductor after the connection box has moved into the first position from the second position.

* * * * *